the caster wheel or wheels which support
UNITED STATES PATENT OFFICE.

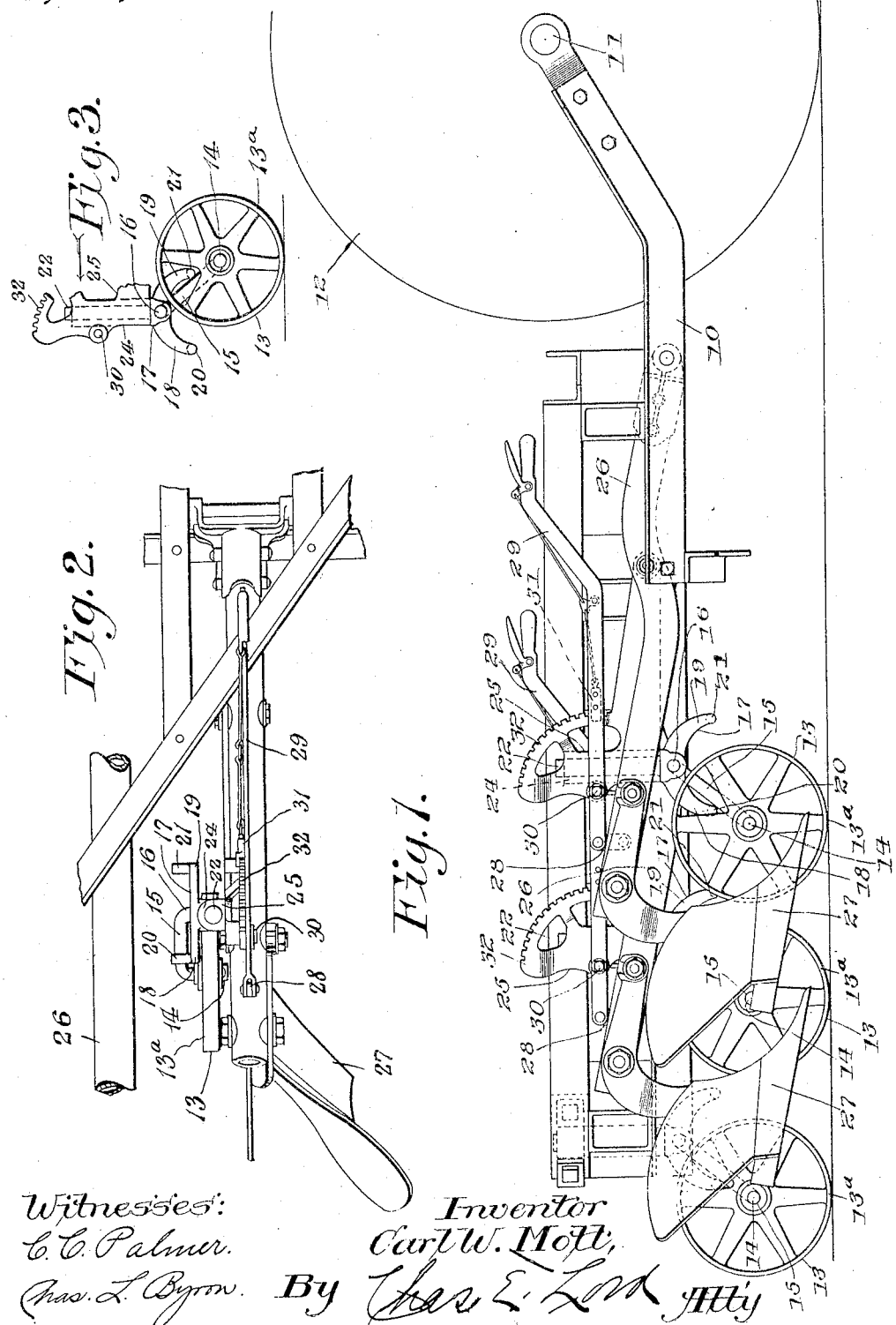

CARL W. MOTT, OF CHICAGO, ILLINOIS, ASSIGNOR, BY MESNE ASSIGNMENTS, TO INTERNATIONAL HARVESTER COMPANY, A CORPORATION OF NEW JERSEY.

PLOW.

1,328,756.

Specification of Letters Patent.  Patented Jan. 20, 1920.

Application filed September 3, 1914.  Serial No. 860,034.

*To all whom it may concern:*

Be it known that I, CARL W. MOTT, a citizen of the United States, residing at Chicago, in the county of Cook and State of Illinois, have invented certain new and useful Improvements in Plows, of which the following is a full, clear, and exact specification.

This invention relates to plows, and more particularly to caster wheels therefor.

The main object of this invention is to insure a proper actuation of a plow in different directions.

Another object of my invention is to facilitate the backing of a plow secured to a traction engine or the like.

A still further object of my invention is to provide a simple, practical and reversible caster wheel which may be used not only as a caster wheel for the frame of a plow, but also as a depth regulating wheel for individual plows.

These and other objects are accomplished by providing a plow frame, plows mounted in said frame, a reversible caster wheel for said plow frame, and reversible caster depth-regulating wheels for the individual plows mounted in said frame.

The invention is illustrated on the accompanying sheets of drawings, in which—

Figure 1 is a fragmentary side elevation of a plow rigidly secured to a traction engine and embodying my invention;

Fig. 2 is a partial plan view of the same arrangement shown in Fig. 1; and

Fig. 3 is a side elevation of my reversible caster wheel.

The various novel features of my invention will be apparent from the following description and drawings, and will be particularly set forth in the appended claims.

Plows both in the form of gang plows and single plows, as generally used, are connected to the source of power, such as a tractor, by a flexible connection, or by a rigid connection. When plows are connected to tractors by means of a flexible connection it is impossible to back the plows with the tractor. When the plows are connected rigidly to the tractor the plows can be backed by reversing the direction of movement of the tractor. In backing plows, the caster wheel or wheels which support the plow frame swing with their vertically arranged shafts, the caster wheels and parts thereof turning through an angle of 180°. In some constructions it is not always convenient to allow space for the complete turning of a caster wheel through 180°. For this reason I have provided reversible caster wheels which occupy the minimum amount of space, and permit easy backing of plows. When I speak of a reversible caster wheel I mean a caster wheel the wheel of which is not only capable of swinging about a vertical axis, but capable also of swinging bodily about a horizontal axis, and having a relative longitudinal movement with respect to the plow frame or support.

As shown in the accompanying drawings, I have provided a plow frame 10, which is rigidly connected to the rear axle 11 of a traction engine 12, the rear end of the frame 10 being provided with one of my reversible caster wheels 13, including a wheel 13ª and associated supporting parts. This wheel is mounted upon a horizontal portion 14 of a U-shaped link 15, having a second horizontal portion 16 journaled in a forked member 17 having two arms 18 and 19 provided respectively with projections 20 and 21 lying in the path of movement of the link 15 for limiting the relative longitudinal movements of the wheels 13ª with respect to the forked member 17 and frame 10. As shown in Fig. 3 the upright shaft portion 22 of the forked member 17 is journaled in a bearing portion 24 of a casting 25 pivotally mounted to the plow beam 26, which in turn is pivotally mounted in the main plow frame 10.

My reversible caster wheel, as here shown, is used for supporting the main frame 10 connected to the tractor 12, and also as a depth regulating wheel for the individual plows 27 which are secured to the plow beams 26. Connected to each of the plow beams 26 by a suitable link 28 is an operating lever 29 pivotally connected at 30 to the casting 24, said lever having a detent 31 for engaging the various notches in the sector 32 formed integrally with said casting 24. The plows 27 may be raised and lowered by operating the hand levers 29, causing a relative movement between the plows and their corresponding caster wheels.

As shown in Figs. 1 and 2 of the drawings, the plows are connected to the tractor through the frame 10 for forward movement, the wheels 13ª being held in a corresponding position by the engagement of link 15 and limiting projection 20 of the forked member 17. With the parts in said position, should it be desired to back the plows, the same could be readily accomplished without swinging the caster wheels through an angle of 180° about their vertical axes. In backing the plows the first movement would be a relative longitudinal movement between the wheels 13ª and the plow frame 10, or between the wheels 13ª and the forked members 17, the wheels remaining substantially stationary while the plow beams 26, frame 10, and all parts rigidly connected thereto are moved rearwardly. This relative movement will continue until the link member 15 has passed over and into engagement with the other limiting projection 21 of the forked member, as shown in Fig. 3. In pulling a plow forward from such position, that is, with the reversible caster wheel shown as in Fig. 3, the link 15 of each of the caster wheels will pass out of engagement with the limiting projection 21 and into engagement with the limiting projection 20. This reversing action, back and forth, is accomplished without the wheel 13 castering about a vertical axis.

By means of this arrangement all of the advantages of the ordinary caster wheel are retained, and in addition thereto reversing the direction of movement of the plow is greatly facilitated. This reversible caster wheel finds use not only as a frame supporting wheel, as shown in connection with the plow frame 10, but also as a depth regulating wheel, as above set forth.

It is apparent that there may be modifications in the arrangement herein particularly shown and described, and it is my intention to cover all such modifications which do not involve a departure from the spirit and scope of my invention as set forth in the appended claims following.

What I claim as new is:

1. In combination, a support, a member journaled in said support and having limiting means, a link journaled in said member, and a wheel mounted on said link having a relative movement with respect to said member, said relative movement being limited by engagement of said limiting means and link.

2. In combination, a support, a member journaled in said support and having limiting portions, a link having a horizontal portion journaled in said member, and a wheel mounted on said link and having a relative movement with respect to said member, said relative movement being limited by engagement of said link and limiting portions.

3. In combination, a movable frame, a caster supporting the frame and vertically journaled thereon, portions of the frame preventing a complete swing of the caster upon a vertical axis, and means on the caster independent of the vertical journal whereby the caster wheel may assume a trailing position in either forward or reverse movements of the movable frame.

4. In a caster adapted to support a frame, a wheel, a supporting member therefor having independent swinging movement relative to said frame about a fixed vertical axis and about a horizontal axis and means for limiting the swing about both axes.

5. In a caster, a shaft movable about a vertical axis, a link pivotally carried thereby for movement about a horizontal axis, a wheel thereon, and stops for limiting the movement about the horizontal axis, whereby the wheel may swing from one castering position to the other without turning about the vertical axis.

6. In combination, a frame, a caster therefor having a wheel mounted for swinging movement in both vertical and horizontal planes, frame elements limiting the swing of said caster in a horizontal plane, means associated with said caster for lifting the frame and means for locking in the adjusted positions.

7. In combination, a frame, a caster therefor having a member rotatable about a vertical axis, a link pivotally mounted on said member for swinging movement in a vertical plane, a wheel on said link, frame elements limiting the swing of said caster in a horizontal plane, means associated with said caster for lifting the frame and means for locking in the adjusted positions.

In testimony whereof I affix my signature, in the presence of two witnesses.

CARL W. MOTT.

Witnesses:
H. D. MacDONALD,
E. J. KANE.